United States Patent [19]

Suda

[11] Patent Number: 4,975,318

[45] Date of Patent: Dec. 4, 1990

[54] IMPROVED ACOUSTIC CARBON DIAPHRAGM

[75] Inventor: Yoshihisa Suda, Maebashi, Japan

[73] Assignee: Mitsubishi Pencil Co., Ltd., Tokyo, Japan

[21] Appl. No.: 473,749

[22] Filed: Feb. 2, 1990

Related U.S. Application Data

[62] Division of Ser. No. 239,266, Sep. 1, 1988, Pat. No. 4,919,859.

[51] Int. Cl.$^5$ .............................................. B32B 7/00
[52] U.S. Cl. .................................. 428/260; 181/157; 428/284; 428/408
[58] Field of Search ....................... 428/260, 284, 408; 181/157

[56] References Cited

U.S. PATENT DOCUMENTS

| | | | |
|---|---|---|---|
| 3,233,014 | 2/1966 | Bickerdeke et al. | 264/29.1 |
| 3,238,054 | 3/1966 | Bickerdike et al. | 427/227 |
| 3,317,338 | 5/1967 | Batchelor | 427/249 |
| 3,936,535 | 2/1976 | Boder | 427/228 |
| 4,178,413 | 12/1979 | De Munda | 427/227 |
| 4,855,093 | 8/1989 | Yoshida . | |

*Primary Examiner*—James J. Bell
*Attorney, Agent, or Firm*—Oliff & Berridge

[57] ABSTRACT

An improved acoustic diaphragm may be produced by a process which includes the steps of impregnating non-woven fabric or woven fabric of carbon fiber having a high degree of elasticity with a thermosetting resin, thermally molding it into a diaphragm shape, calcining the shaped fabric in an inert gas atmosphere to obtain a porous carbon molding, heating the porous molding to a uniform temperature, and depositing vapor phase, thermally decomposed carbon upon a surface of the porous molding. The deposited carbon is generated by thermal decomposition of a hydrocarbon-containing material introduced together with a carrier gas. The acoustic diaphragm so prepared has a dense surface layer of carbonized fiber-carbonized thermosetting resin-thermally decomposed carbon, and a porous interior of carbonized fiber bonded together by carbonized resin and the thermally decomposed carbon. Thus, the process permits manufacture of a diaphragm made of a carbon material having a large E/P value with the carbon material mostly made of a carbon fiber having high elasticity and a carbonized residue of a thermosetting resin.

13 Claims, No Drawings

IMPROVED ACOUSTIC CARBON DIAPHRAGM

This is a Division of application Ser. No. 07/239,266 filed Sept. 1, 1988 now U.S. Pat. No. 4,919,859.

BACKGROUND OF THE INVENTION

The present invention relates to a process for producing an acoustic carbon diaphragm made of carbonaceous materials. More particularly, the invention relates to a process for producing an acoustic carbon diaphragm of carbonaceous materials having a light weight, a high elasticity, a fast sound transmission velocity and an excellent rigidity as compared with a conventional diaphragm material used as a speaker and a microphone, less deformation by an external force, small distortion of sound, wide reproducing sound range, distinct sound quality, adapted for a digital audio age.

It is generally desired to satisfy as a diaphragm for a speaker and a voice coil bobbin the following conditions.
(1) small density,
(2) large Young's modulus,
(3) large propagating velocity of longitudinal waves,
(4) adequately large internal loss of vibration, and
(5) stable against variation in the atmospheric conditions, no deformation nor change of properties.

More specifically, the material for the diaphragm is required to have a wide reproducing sound range to be reproduced in high-fidelity over a broad frequency band. To efficiently and distinctly produce sound quality, the material should have high rigidity, no distortion such as creep against external stress as well as a large sound propagating velocity. In order to further increase the sound velocity from the equation of $$V = (E/\rho)^{\frac{1}{2}}$$

where V: sound velocity, E: Young's modulus, $\rho$: density. the material which has small density and high Young's modulus is obtained.

The materials use paper (pulp), plastic, and further contain glass fiber, carbon fiber compositely mixed with the basic material of them, or processed to metal of aluminum, titanium, magnesium, beryllium, or boron, metal alloy, metal nitride, metal carbide, or metal boride. However, the paper, plastic and their composite materials have small Young's modulus and small density. Thus, the sound velocities of these materials are slow. Vibration division occurs in a specific mode and the frequency characteristics in the high frequency band of the materials are particularly low, resulting in a difficulty in producing distinct sound quality. In addition, these materials are feasibly affected by the external environments such as temperature, and moisture, causing deterioration in the quality and ageing fatigue, thereby disadvantageously decreasing the characteristics. On the other hand, when the materials employ metal plates of aluminum, magnesium, titanium, the sound velocities of the materials are faster than paper or plastic, but since the materials have small E/$\rho$ value and small internal loss of vibration, the materials have sharp resonance phenomenon in high frequency band or ageing fatigue such as creep occurs in the materials, thereby disadvantageously deteriorating the characteristics. The beryllium or boron provide excellent physical properties. Squawkers or tweeters which use the materials as the diaphragms extend in reproducing limit to audible frequency bands or higher, thereby correctly producing natural sound quality without transient phenomenon by the signals in the audible band. However, these materials are less as resources, and very expensive, and have difficulties in the industrial machining. These processes are difficult to produce speakers of large size.

In addition to these materials, there is a trial to obtain the diaphragms made of carbonaceous material due to large E/$\rho$ value of carbon materials. That is, there are:
(1) a method for carbonizing to solely graphite a resin sheet or film,
(2) a method for shaping and carbonizing to graphite a composite material of resin and various carbonaceous powder, and
(3) a method for carbonizing to graphite carbon fiber-reinforced plastic.

Since the method (1) has small carbon yield of used plastic material, a precise product is not only hardly obtained, but a product having high Young's modulus like graphite or carbon fiber cannot be obtained due to carbon made of plastic.

The method (2) can obtain a production having high Young's modulus as compared with the method (1) by using graphite or carbon fiber, but since it uses various resin so as to improve the moldability, the ratio of the resin carbon to the calcined material is large to cause the Young's modulus of the carbon fiber or graphite to decrease.

Since only the plastic portion is baked and contracted in the method (3) when the carbon fiber-reinforced plastic is calcined, numerous fine cracks occur among carbon fibers so that a product in which the carbon fiber and the resin carbon are integrated without defect cannot be obtained. Therefore, it has such a drawback that the function of the carbon fiber is lost.

SUMMARY OF THE INVENTION

Accordingly, an object of the present invention is to provide a process for producing an acoustic carbon diaphragm of carbonaceous materials, which can eliminate the above-described drawbacks of the materials for the conventional diaphragms and which is made of a carbon material having large E/$\rho$ value with the carbon material mostly made of carbon fiber having high elasticity and the residue made of carbon material having high elasticity in high accuracy without crack inexpensively in an industry.

The inventor has devised from the results of studies in view of the above-described drawbacks so as to achieve the above-mentioned object, and has resultantly invented a process for producing an acoustic carbon diaphragm of carbonaceous materials comprising the steps of impregnating nonwoven fabric or woven fabric of carbon fiber having high elasticity with thermosetting resin to then thermally mold it in a diaphragm shape, calcining it in an inert gas atmosphere to obtain a porous carbon molding made of carbon fiber-resin carbon, heating the molding as a base material to equal temperature, and depositing vapor phase thermally decomposed carbon generated by the thermal decomposition of hydrocarbon introduced together with carrier gas on the surface in a structure that the surface is made of a dense layer of carbon fiber-resin carbon-thermally decomposed carbon, and the interior is made of porous material that carbon fiber as a skeleton and coupled by the resin carbon and the thermally decomposed carbon.

Since the carbon diaphragm obtained by the process of the present invention maintains accurate size and shape at the time of molding, exhibits high elasticity and high sonic velocity, and has a porous portion, the diaphragm is lighter than the product made of dense layer carrier and is hard to deform.

A process for producing an acoustic carbon diaphragm according to the present invention will now be described.

As the high elasticity carbon fiber are usable nonwoven fabric, such as felt of pitch or polyacrylonitrile series, woven fabric, such as plain weave fabric, spiral weave fabric or bias weave fabric of polyacrylonitrile, or short fiber fabric such as pitch short fiber, polyacrylonitrile short fiber, carbon whisker, etc. impregnated with thermosetting resin, such as phenol resins, furan resins, xylene resins, toluene resins, or resorcinol resins, and the material is thermoset and molded in a mold. At this time, the fiber content of the resin is increased, or a porous layer is arbitrarily formed by regulating the air gap amounts in the cured material by pressure curing.

Then, the material is molded in necessary size and shape, aftercared, and calcined at 500° C. or higher in an inert gas atmosphere to obtain a base material made of carbon fiber-thermosetting resin carbon. At this time, the resin carbon is finely cracked upon carbonization and contraction of the thermosetting resin. The quantity of the contained thermosetting resin depends upon the molding shape, the presence or absence of pressure, the state of the used carbon fiber, and the elasticity value, but is set to the minimum as required so as to prevent it from deforming at the time of calcining without completely burying the spaces among the carbon fibers. The base material obtained is first heated by an induction heating system using a high frequency induction furnace or a heating system using a lateral tubular furnace, hydrocarbon of material is introduced together with carrier gas, such as argon, etc. in contact with the heated base material to thermally decompose the hydrocarbon, and the carbon is produced and deposited. As the hydrocarbon of the material are usable methane, propane, benzene, acetylene, etc. When ethylene chloride, such as 1,1-dichloroethylene, cis-1,2-dichloroethylene, trans-1,2-dichloroethylene, 1,1,2-trichloroethylene, and ethane chloride, such as 1,1-dichloroethane, 1,2-dichloroethane, 1,1,1-trichloroethane, 1,1,2-trichloroethane, etc. to be thermally decomposed at low temperature are used, thermally decomposed carbon at 1100° C. and most preferably 900° C. is obtained thereby improving the productivity. It is necessary in this case of maintain all the surfaces at equal temperature without temperature gradient. From this, the thermally decomposed carbon obtained by the thermal decomposition of the material introduced together with the carrier gas can be uniformly deposited on the surface layer. When the base material is held at the equal temperature, the thermally decomposed carbon is preferentially deposited from the surface of the base material. Thus, before the porous layer therein is buried, the space among the carbon fiber-resin carbon-carbon fiber of the surface is covered completely. As a result, the fine cracks generated at the time of calcining are completely buried, and a porous layer of three-dimensional mesh shape obtained by depositing the thermally decomposed carbon in the degree of reinforcing the structure that the surface is formed of gas impermeable dense layer made of carbon fiber, resin carbon and thermally decomposed carbon and the interior is formed of carbon fiber as a skeleton and the resin carbon for bonding them. Here, the hydrocarbon concentration in the carrier gas depends upon the temperature of the base material, the gas pressure and velocity, 20 vol. % is practically preferable. The higher the temperature of the base material is, the lower the concentration is necessarily. The concentration is enhanced if the gas pressure in a vessel for producing the thermally decomposed carbon is lower. Thus, the higher the gas flow velocity is, the greater the concentration can be. In order to accelerate the depositing velocity, the material concentration is increased. In order to enhance the carbon yield, it is effective to reduce the gas flow rate. The thermally decomposed carbon can be obtained at the depositing velocity of several mm/H at the maximum by this regulations. The carbon fiber having high elasticity designates the high elasticity carbon fiber sold in the market, and the general elasticity value is 2.7 to $7.0 \times 10^7$ $g/mm^2$, and the elasticity of the ordinary resin carbon is 2.0 to $3.3 \times 10^6$ $g/mm^2$, and the elasticity of the thermally decomposed carbon is lower than 3.0 to $6.0 \times 10^6$ $g/mm^2$. Therefore, it is preferable to bond the carbon fibers thereamong by using the thermally decomposed carbon as much as possible, thereby improving the elasticity as large as possible.

DESCRIPTION OF THE PREFERRED EMBODIMENTS

The present invention will be described by examples of process for producing an acoustic carbon diaphragm, but the present invention is not limited to the particular examples.

EXAMPLE 1

Plain weave fabric of carbon fiber having $4.0 \times 10^7$ $g/mm^2$ of elasticity was immersed in a vessel filled with 100 parts by weight of initial condensate of furfuryl alcohol/furfural resin (VF-302 produced by Hitachi Chemical Co., Ltd., Japan) and 0.8 part by weight of hardener ($A_3$ hardener) at a ratio, the fabric was then passed between two rolls regulated at its gap, and compressed air was blown to remove excessive amount of resin. Then, the fabric was interposed between a recess mold and a projecting mold of diaphragm shape, held in the molds at 80° C. for 5 min. for the resin to be cured and molded in a diaphragm shape. The obtained molding contained 80 parts by weight of carbon fiber and 20 parts by weight of resin. The molding was aftercared at 150° C. for 30 min. in an air oven, and calcined at the temperature rising velocity of 200° C./hour up to 1000° C. in a calcining furnace of a nitrogen gas atmosphere to obtain a base material of diaphragm shape. The obtained base material exhibited no change in the size and the shape, and the carbonization ratio was 80 parts by weight of carbon fiber and 7 parts by weight of resin carbon. Then, the base material was heated by an induction heating system using a high frequency induction furnace to deposit thermally decomposed carbon. At this time, the material used cis-1,2-dichloroethylene, carrier gas used argon gas, the material concentration was 13 vol. %, the gas flow rate was 400 ml/min., the base material temperature was held at 900° C., and the thermally decomposed carbon was deposited for 0.5 hour to obtain a carbon diaphragm.

The carbon ratio of the obtained diaphragm was 80 parts by weight of carbon fiber, 7 parts by weight of resin carbon, and 12 parts by weight of thermally decomposed carbon. When the section of the dense layer of the diaphragm was observed by a polarizing microscope, a layer of thermally decomposed carbon of approx. 0.1 mm was observed on the carbon fiber. The same flat test piece in thickness was produced under the same conditions as this diaphragm, and various values were measured. The density was 1.34 g/cm$^3$, the elasticity was 220 GPa, and the sonic velocity was 12800 m/sec.

EXAMPLE 2

A base material was obtained under the same conditions as those obtained in the Example 1, this base material was heated by an external heating system using a lateral tubular furnace, and a thermally decomposed carbon was deposited. At this time, the material used propane, carrier gas used argon gas, the material concentration was 15 vol. %, the gas flow rate was 430 ml/min., the base material temperature was held at 1300° C., and the thermally decomposed carbon was deposited for 1 hour to obtain a carbon diaphragm. The carbon ratio of the obtained diaphragm was 80 parts by weight of carbon fiber, 7 parts by weight of resin carbon and 18 parts by weight of thermally decomposed carbon. When the section of the dense layer of the diaphragm was observed by a polarizing microscope, a layer of thermally decomposed carbon of approx. 0.25 mm was observed on the carbon fiber. The same flat test piece in thickness was produced under the same conditions as this diaphragm, and various values were measured. The density was 1.49 g/cm$^3$, the elasticity was 200 GPa, and the sonic velocity was 11600 m/sec.

What is claimed is:

1. An improved acoustic diaphragm of carbonaceous material prepared by a process comprising the steps of:
    impregnating a member selected from the group consisting of nonwoven fabric of carbon fiber having high elasticity and woven fabric of carbon fiber having high elasticity with thermosetting resin to form an impregnated carbon fiber fabric;
    thermally molding said impregnated carbon fiber fabric into a diaphragm shape to form a molding,
    calcining said molding in an inert gas atmosphere to obtain a porous carbon molding made of carbonized fiber and carbonized thermosetting resin,
    heating said porous carbon molding to a uniform temperature, and
    depositing vapor phase carbon upon a surface of said porous carbon molding, said carbon being generated by thermal decomposition of a hydrocarbon-containing material introduced together with a carrier gas, to produce an acoustic diaphragm having a surface comprising a dense layer of carbonized fiber-carbonized thermosetting resin carbon-thermally decomposed carbon, and an interior comprising a porous material of carbonized fiber bonded to the carbonized thermosetting resin carbon and the thermally decomposed carbon.

2. The acoustic diaphragm according to claim 1, wherein said carbon fiber is selected from the group consisting of polymer organic fiber, carbon fiber obtained from low molecular weight fiber, and whisker obtained by a vapor phase growing method.

3. The acoustic diaphragm according to claim 1, wherein said thermosetting resin is a monomer or initial condensate selected from the group consisting of, furan resins, phenol resins, xylene resins, toluene resins, resorcinol resins, resol resins and novolak resins.

4. The acoustic diaphragm according to claim 1, wherein said hydrocarbon is selected from the group consisting of methane, propane, benzene and acetylene.

5. The acoustic diaphragm according to claim 1, wherein said containing material is selected from the group consisting of 1,1-dichloroethylene, cis-1,2-dichloroethylene, trans-1,2-dichloroethylene, 1,1,2-trichloro-ethylene, 1,1-dichloroethane, 1,2-dichloroethane, 1,1,1-trichloroethane, and 1,1,2-trichloroethane.

6. The acoustic diaphragm according to claim 1, wherein said carrier gas is an inert gas.

7. The acoustic diaphragm according to claim 1, wherein said calcining step is performed at a temperature of at least 500° C.

8. The acoustic diaphragm according to claim 1, wherein said dense layer is a gas impermeable layer prepared by filling thermally decomposed carbon in pores at a surface of said porous carbon molding.

9. The acoustic diaphragm according to claim 1, wherein said dense layer is obtained by depositing the thermally decomposed carbon on a porous molding having a three-dimensional mesh shape made of a carbonized fiber skeleton connected by carbonized thermosetting resin carbon in said porous molding.

10. The acoustic diaphragm of claim 2 wherein said polymer organic fiber is polyacrylonitrile.

11. The acoustic diaphragm of claim 2 wherein said carbon fiber is selected from the group consisting of pitch and graphited fiber made from pitch.

12. The acoustic diaphragm of claim 3 wherein said thermosetting resin is a furan resin selected from the group consisting of furfuryl alcohol resin and furfuryl alcohol/furfural cocondensate resin.

13. The acoustic diaphragm of claim 6 wherein said inert gas is selected from the group consisting of hydrogen gas, nitrogen and argon gas.

* * * * *